(12) United States Patent
Salatandre

(10) Patent No.: US 12,446,665 B2
(45) Date of Patent: Oct. 21, 2025

(54) NFC ENABLED BUTTON

(71) Applicant: bigDAWGS Promotions Inc., Scarborough (CA)

(72) Inventor: Edgar Davin Salatandre, Scarborough (CA)

( * ) Notice: Subject to any disclaimer, the term of this patent is extended or adjusted under 35 U.S.C. 154(b) by 702 days.

(21) Appl. No.: 17/142,924

(22) Filed: Jan. 6, 2021

(65) Prior Publication Data

US 2021/0204657 A1     Jul. 8, 2021

Related U.S. Application Data

(60) Provisional application No. 62/957,569, filed on Jan. 6, 2020.

(51) Int. Cl.
| | |
|---|---|
| *H04W 4/80* | (2018.01) |
| *A44B 1/08* | (2006.01) |
| *A44C 3/00* | (2006.01) |
| *G04B 5/00* | (2006.01) |
| *H04B 5/70* | (2024.01) |
| *A44B 9/16* | (2006.01) |

(52) U.S. Cl.
CPC ............ *A44B 1/08* (2013.01); *A44C 3/001* (2013.01); *H04B 5/70* (2024.01); *H04W 4/80* (2018.02); *A44B 9/16* (2013.01)

(58) Field of Classification Search
CPC .............................. A44C 3/001; G09F 3/207
See application file for complete search history.

(56) References Cited

U.S. PATENT DOCUMENTS

| | | | | |
|---|---|---|---|---|
| 1,765,325 | A * | 6/1930 | Day | A44C 3/001 40/722 |
| 5,283,966 | A * | 2/1994 | Rader | A44C 3/001 40/1.5 |
| 5,457,852 | A * | 10/1995 | Liu | A44C 3/001 24/103 |
| 6,269,574 | B1 * | 8/2001 | Sokolofski | G09F 3/12 40/668 |
| 6,726,252 | B1 * | 4/2004 | Chaikel | G09F 3/10 283/105 |
| 6,907,683 | B1 * | 6/2005 | Kronblad | A44C 3/001 40/1.5 |
| 7,069,678 | B2 * | 7/2006 | Kaneko | A44C 3/001 40/1.5 |
| 7,327,217 | B2 * | 2/2008 | Carter | G06K 19/02 340/8.1 |
| 7,479,882 | B2 * | 1/2009 | Mahaffey | G06K 19/07327 340/572.3 |
| 7,635,089 | B2 * | 12/2009 | Augustinowicz | G06K 19/07327 40/652 |
| 8,833,664 | B2 * | 9/2014 | Choi | H01Q 1/2225 235/487 |
| 9,545,135 | B2 * | 1/2017 | Schmitz | G09F 3/185 |

(Continued)

*Primary Examiner* — Shin H Kim
(74) *Attorney, Agent, or Firm* — Smart & Biggar LP

(57) ABSTRACT

The improved button is of the type having: a metal backer, the backer carrying one of a safety pin and a magnetic clasp; and an overlay disposed upon and in gripping relation to the backer. The improvement includes: a chip disposed between the overlay and the backer, the chip being selected from the group consisting of Near Field Communication tag and RFID chip; and a layer of blocker disposed between the chip and the backer, the layer being adapted to permit operation of the chip.

8 Claims, 6 Drawing Sheets

(56) References Cited

U.S. PATENT DOCUMENTS

| | | | |
|---|---|---|---|
| 10,163,054 B2* | 12/2018 | Van Rens | G06K 19/07771 |
| 10,332,373 B1* | 6/2019 | Dehmubed | G08B 13/2417 |
| 10,521,711 B1* | 12/2019 | Ge | G06K 7/10366 |
| 2005/0035860 A1* | 2/2005 | Taylor | G06K 17/0022 |
| | | | 340/572.1 |
| 2005/0060925 A1* | 3/2005 | Kaneko | A44C 27/00 |
| | | | 40/661.04 |
| 2006/0117617 A1* | 6/2006 | Peterson | A44C 3/001 |
| | | | 40/1.6 |
| 2006/0250254 A1* | 11/2006 | Harris | G06K 19/07749 |
| | | | 340/572.1 |
| 2007/0157494 A1* | 7/2007 | Barcikowski | A44C 3/001 |
| | | | 40/1.5 |
| 2009/0241392 A1* | 10/2009 | Long | G09F 3/20 |
| | | | 40/661 |
| 2010/0175286 A1* | 7/2010 | Felix | G09F 3/207 |
| | | | 40/1.5 |
| 2011/0254665 A1* | 10/2011 | Lindsay | G06K 19/07345 |
| | | | 340/10.5 |
| 2012/0102802 A1* | 5/2012 | Lodi | G09F 3/207 |
| | | | 40/662 |
| 2014/0053435 A1* | 2/2014 | Schmitz | A44C 3/001 |
| | | | 40/1.5 |
| 2014/0373407 A1* | 12/2014 | Favier | G09F 9/35 |
| | | | 40/518 |
| 2015/0371566 A1* | 12/2015 | Kott | G09F 3/20 |
| | | | 40/606.01 |
| 2016/0064814 A1* | 3/2016 | Jang | H01Q 7/04 |
| | | | 174/377 |
| 2019/0340347 A1* | 11/2019 | Long | H04W 12/47 |
| 2019/0377994 A1* | 12/2019 | Ge | G06K 7/10366 |
| 2020/0401867 A1* | 12/2020 | Dehmubed | G06K 19/07722 |
| 2021/0204657 A1* | 7/2021 | Salatandre | A44B 1/08 |
| 2021/0216843 A1* | 7/2021 | Mochizuki | G06K 19/0776 |
| 2022/0388704 A1* | 12/2022 | Stamatiou | B65C 9/24 |

* cited by examiner

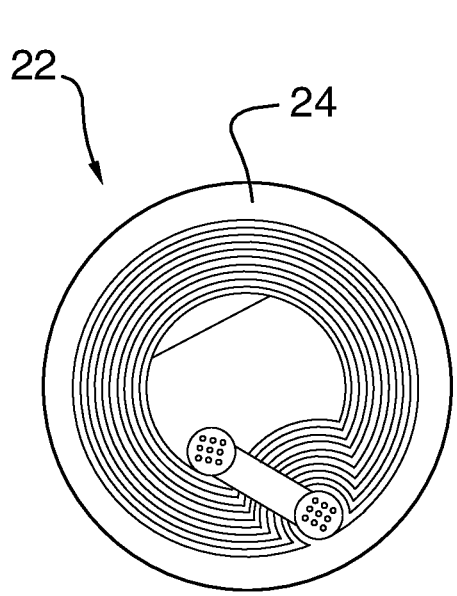
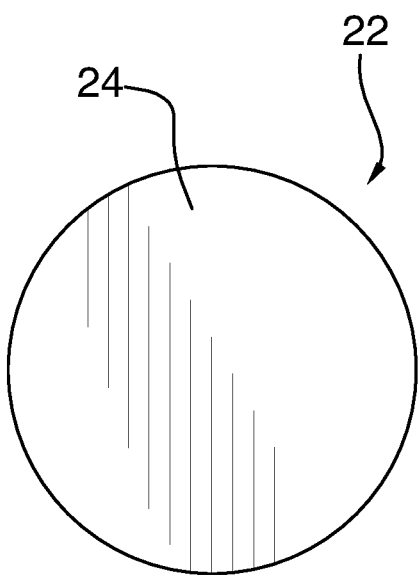
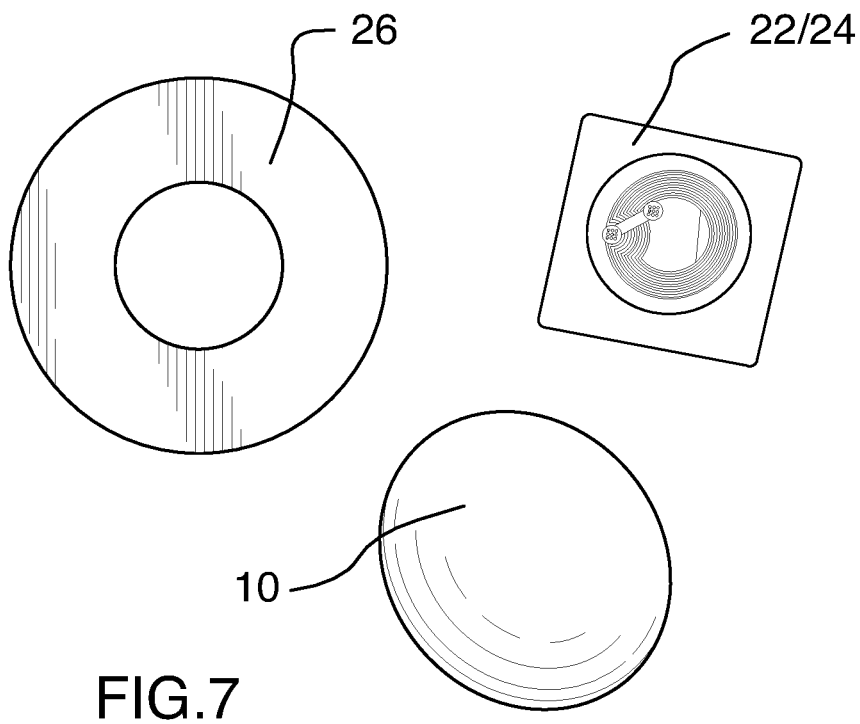
FIG.5
FIG.6
FIG.7

NFC ENABLED BUTTON

CROSS-REFERENCE TO RELATED APPLICATIONS

This application claims priority to U.S. Provisional Patent Application Ser. No. 62/957,569, filed Jan. 6, 2020.

FIELD

The invention relates to the field of promotional items.

BACKGROUND OF THE INVENTION

Buttons are well known in the field of promotional items as are NFC tags.

SUMMARY OF THE INVENTION

Forming an aspect of the invention is an improved button of the type having a metal backer, the backer carrying one of a safety pin and a magnetic clasp, and an overlay disposed upon and in gripping relation to the backer. The improvement comprises:
- a chip disposed between the overlay and the backer, the chip being selected from the group consisting of Near Field Communication tag and RFID chip; and
- a layer of blocker disposed between the chip and the backer, the layer being adapted to permit operation of the chip.

According to another aspect, the overlay can comprise an opaque layer disposed proximal to the backer and a transparent layer disposed distal to the back and securing the opaque layer to the backer.

According to another aspect, the opaque layer can be a printed layer.

According to another aspect, the transparent layer can be Mylar.

Advantages, features and characteristics of the invention will become evident upon review of the following detailed description with reference to the appended drawings, the latter being briefly described hereinafter.

BRIEF DESCRIPTION OF THE DRAWINGS

FIG. 5 is a front view of a prior art NFC tag in use with a blocking layer;
FIG. 6 is a rear view of the structure of FIG. 5;
FIG. 7 is a view of the structure of FIG. 6 alongside a receiver and a button backer.

DETAILED DESCRIPTION

The production of a button according to an embodiment of the invention is illustrated in the figures.

Figure 1:
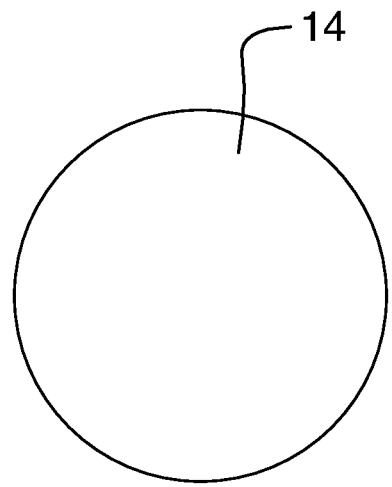
FIG. 1 is a front view of a prior art button.
Figure 2:
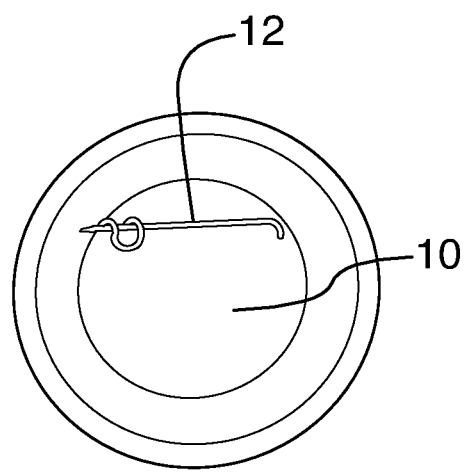
FIG. 2 is a rear view of a prior art button.

As an initial matter, the button is an improvement of the prior art type shown in FIG. 1 and FIG. 2 which comprises a metal backer 10, the backer carrying a safety pin 12 and a cover 14 disposed upon and in gripping relation to the backer, the cover being defined by a printed, opaque layer disposed proximal to the backer and a transparent Mylar layer disposed distal to the backer and in gripping relation to the backer, thereby to secure the opaque layer in place.

The improvement involves a chip 22, a blocker layer 24, an annular receiver 26 and an overlay 28.

Figure 3:
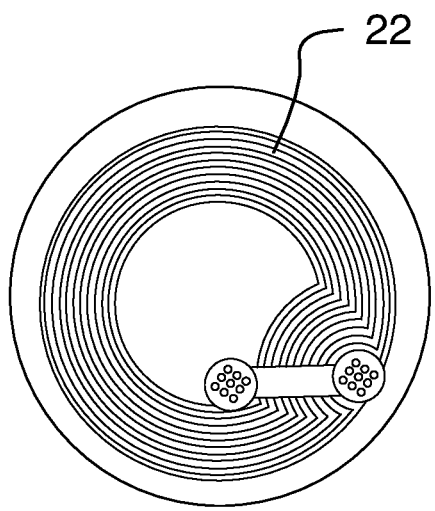
FIG. 3 is a front view of a prior art NFC tag.
Figure 4:
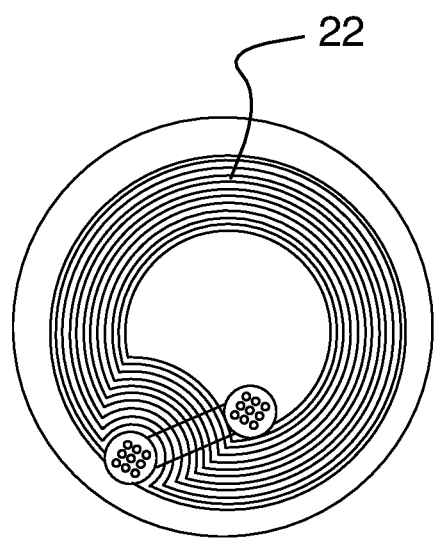
FIG. 4 is a rear view of a prior art NFC tag.

The chip 22 is an NFC tag, as shown in FIG. 3 and FIG. 4

The blocker layer 24 is disposed upon the back of the tag 22, as shown in FIG. 5 and FIG. 6, and has the following characteristics:

| Name | GAE |
| --- | --- |
| Type | Polymeric |
| Suitable Frequency | HF |
|  | 13.56 MHz |
| u'1MHz | 15 typ |
| Standard Size (mm) | 300 * 200 |
|  | 300 * 20000 |
| Thickness (mm) | 0.3 |
| Merit | Economical |
| Halogen Free | OK |
| Working Temp | −30° C. to +85° C. |

Figure 8:
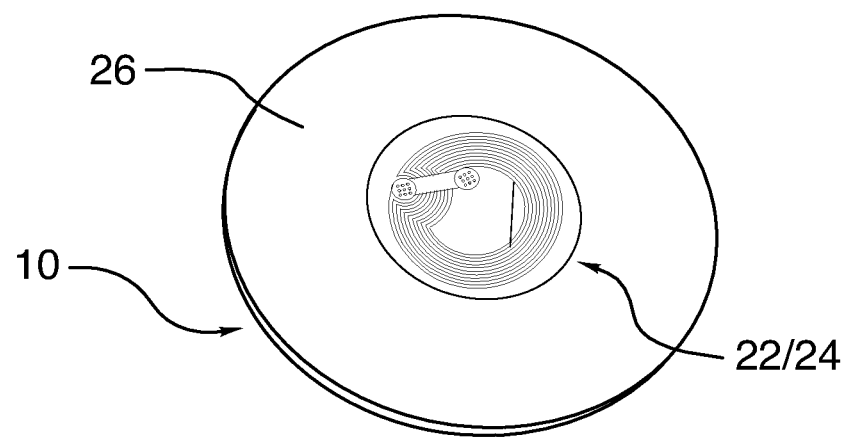
FIG. 8 is a view of the structure of FIG. 5 being inserted in the receiver, the button backer being in receipt of the receiver.
Figure 9:
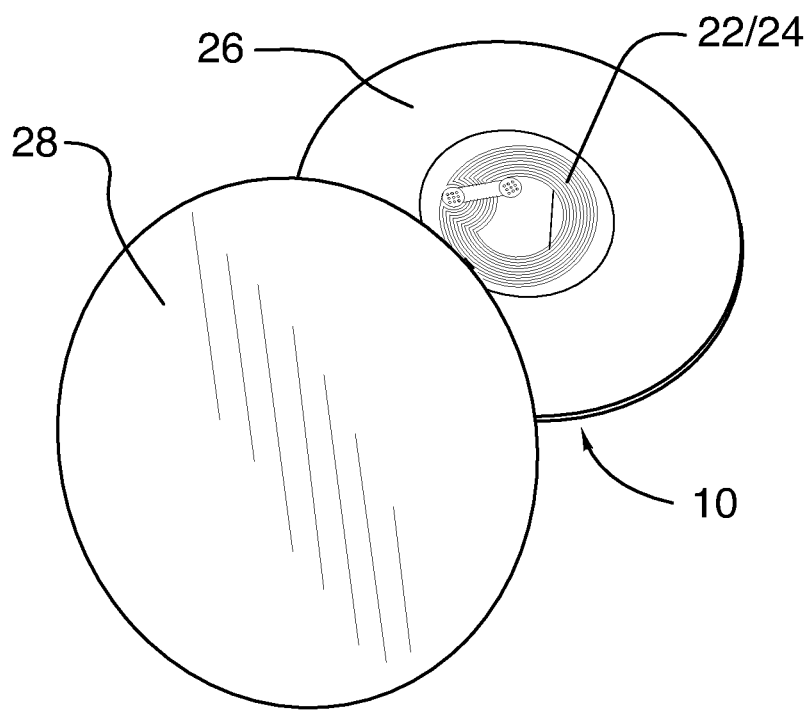
FIG. 9 is a view of the receiver in receipt of the structure of FIG. 6, the button backer being in receipt of the receiver, along with an overlay.
Figure 10:
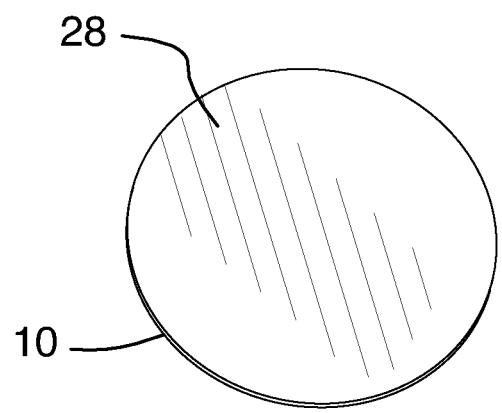
FIG. 10 is a view of the overlay disposed upon the receiver and the structure of FIG. 6, both being disposed upon the button backer.
Figure 11:
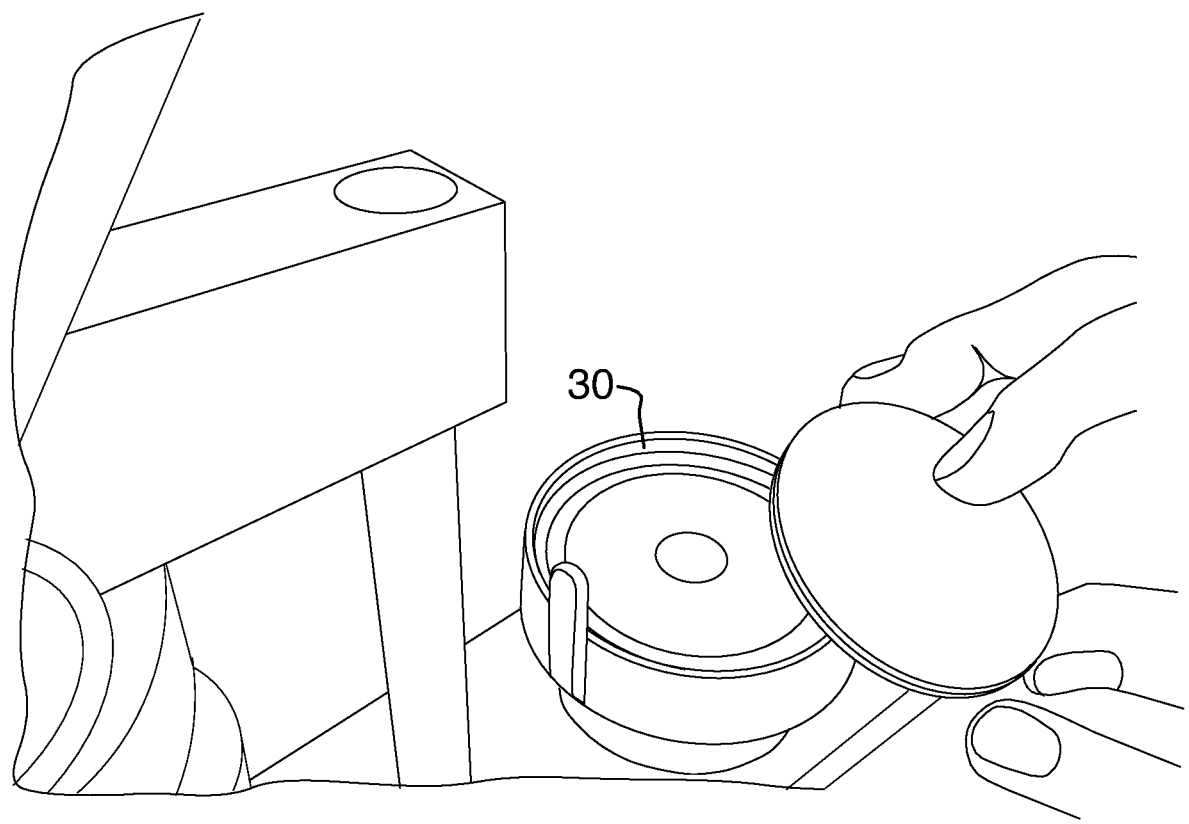
FIG. 11 is a view of the structure of FIG. 10 being disposed in a button former.
Figure 12:
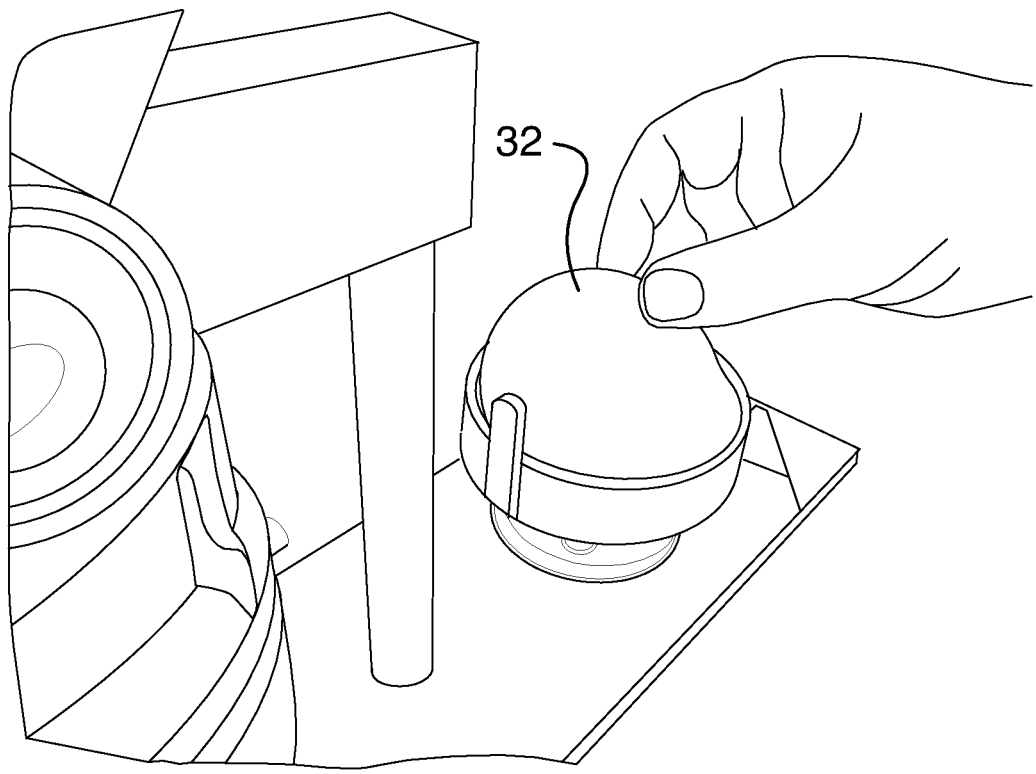
FIG. 12 is a view of an insert being disposed upon the structure of FIG. 10 within the button former.
Figure 13:
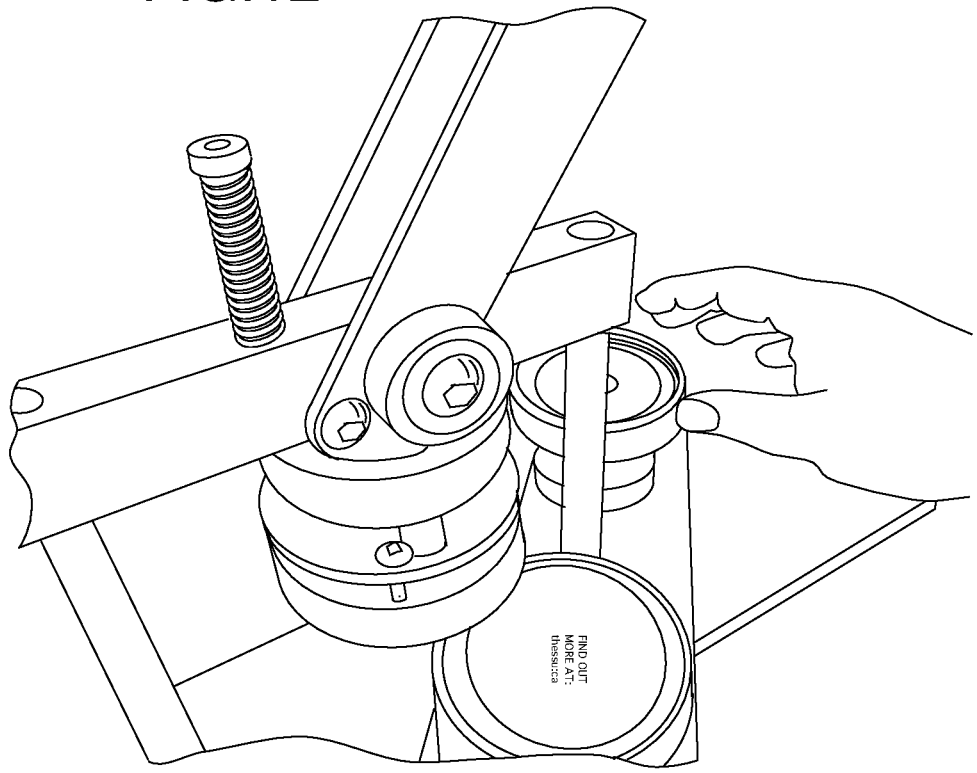
FIG. 13 is a view of the structure of FIG. 12 after a transparent layer has been applied thereto.
Figure 14:
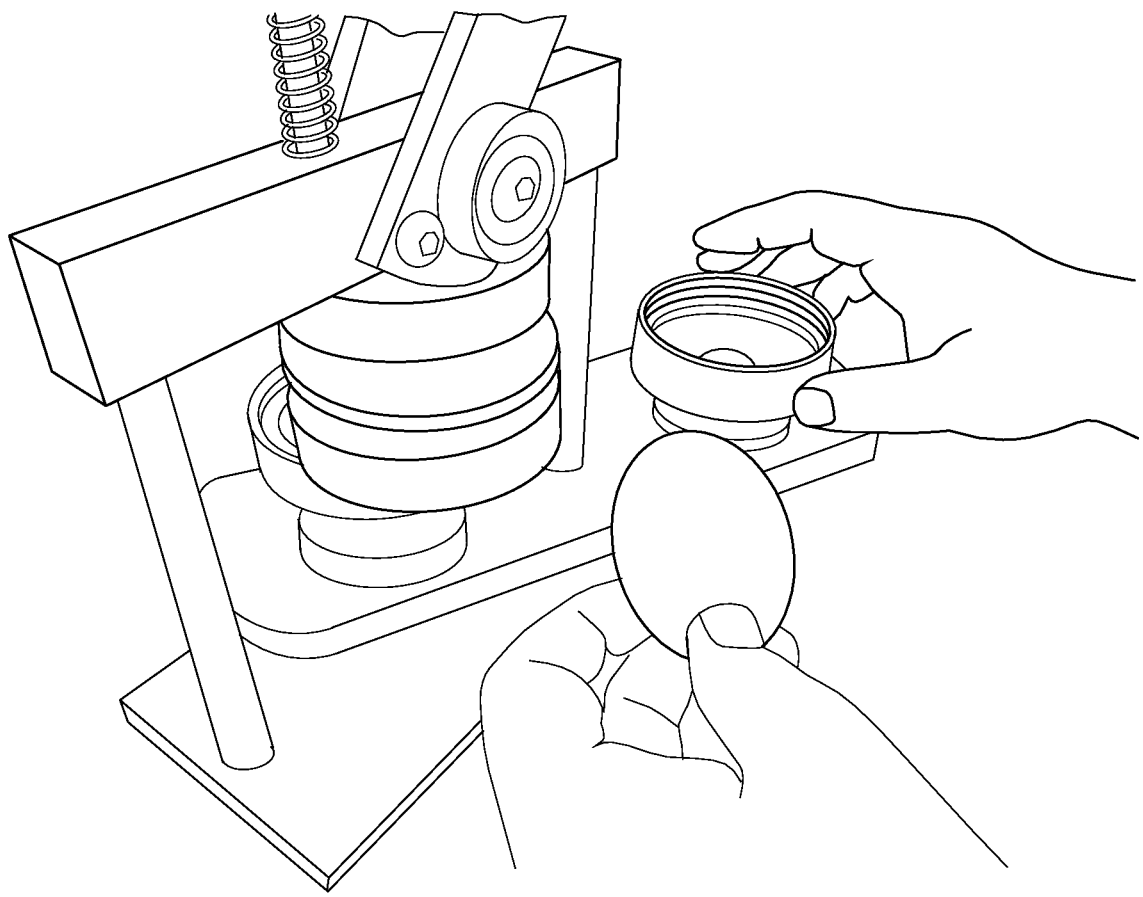
FIG. 14 is a view of the structure of a button being removed from the button former.
Figure 15:
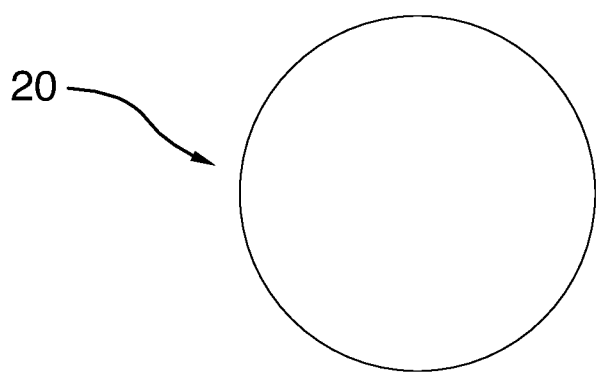
FIG. 15 is a view of an inventive button.

For use:
- receiver 26 is disposed upon the prior art metal backer and the chip/blocker is disposed interiorly of the receiver, as shown in FIG. 8, and thereafter;
- overlay 28 is thereupon placed upon the structure, as indicated by the sequence of FIG. 9 and FIG. 10;
- that structure is then placed in a button former 30, as shown in FIG. 11;
- a printed insert 32 is placed into the button former as shown in FIG. 12;
- a button 20 is formed in a conventional fashion, as shown by FIGS. 13-15.

Surprisingly, the NFC in button 20 is capable of activation in a conventional manner, i.e. by tapping a phone against it, notwithstanding the metal backer [that would be expected to interfere with operation].

Whereas a specific embodiment is shown, variations are possible.

For example, whereas a NFC tag is shown, an RFID chip could also be used. Further, whereas a printed insert is shown, printing is not strictly necessary. Whereas Mylar is indicated for the transparent layer, other materials could be used, and the printed and transparent layers could be combined. Additionally, other blockers could be used. Wave blockers of differing thickness can also be used; a range of 0.3 to 0.6 mm is known to be useful.

Accordingly, the invention should be understood to be limited only by the accompanying claims, purposively construed.

The invention claimed is:

1. An improved button of the type having
a metal backer, the backer carrying one of a safety pin and a magnetic clasp,
an overlay disposed upon and in gripping relation to the backer,
the improvement comprising:
a chip disposed between the overlay and the backer, the chip being a Near Field Communication tag; and
a solid blocker layer disposed between the chip and the backer, the layer disrupting or absorbing 13.56 mHz electromagnetic waves and thereby permitting activation of the chip by a Near Field Communication device placed against the overlay, the chip being positioned in proximity to the backer such that removal of the blocker layer would render the chip unsusceptible to activation by the device placed against the overlay.

2. The button of claim 1, wherein the overlay comprises an opaque layer disposed proximal to the backer and a transparent layer disposed distal to the back and securing the opaque layer to the backer.

3. The button of claim 2, wherein the opaque layer is a printed layer.

4. The button of claim 2, wherein the transparent layer is biaxially-oriented polyethylene terephthalate.

5. An improved button of the type having
a metal backer, the backer carrying one of a safety pin and a magnetic clasp,
an overlay disposed upon and in gripping relation to the backer,
the improvement comprising:
an RFID chip disposed between the overlay and the backer; and
a solid blocker layer disposed between the RFID chip and the backer, the layer disrupting or absorbing 13.56 mHz electromagnetic waves and thereby permitting activation of the chip by an RFID device placed against the overlay, the chip being positioned in proximity to the backer such that removal of the blocker layer would render the chip unsusceptible to activation by the device placed against the overlay.

6. The button of claim 5, wherein the overlay comprises an opaque layer disposed proximal to the backer and a transparent layer disposed distal to the back and securing the opaque layer to the backer.

7. The button of claim 6, wherein the opaque layer is a printed layer.

8. The button of claim 6, wherein the transparent layer is biaxially-oriented polyethylene terephthalate.

* * * * *